Nov. 28, 1933.                L. H. STEIN                1,936,804
                           SHAFT SEALING DEVICE
                            Filed May 5, 1932
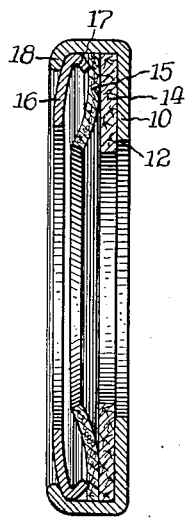
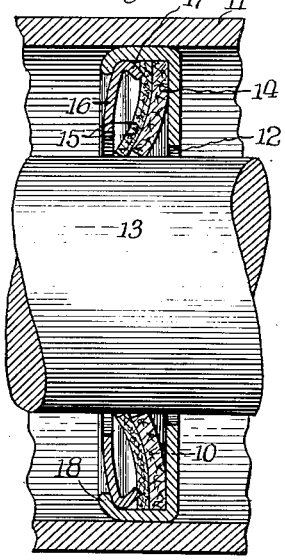
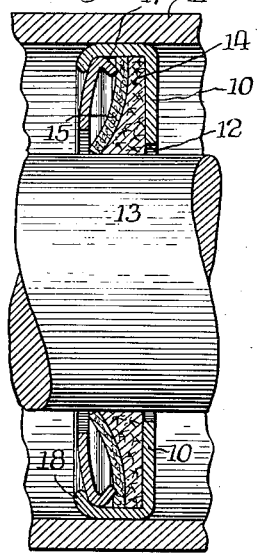
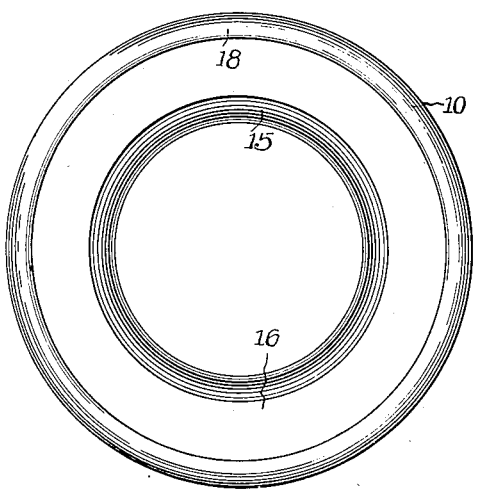
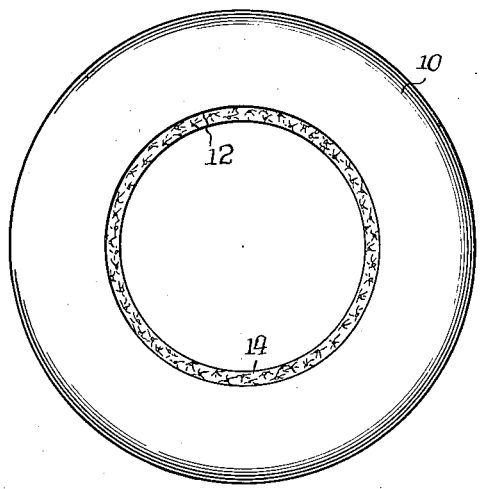
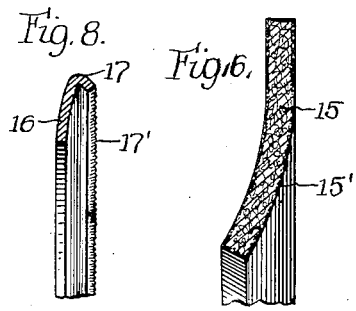
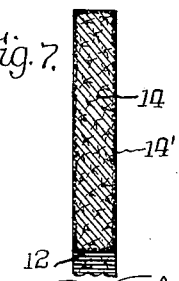
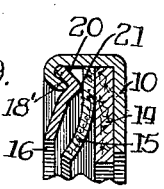
Inventor:
Louis H. Stein,
By Fisher, Clapp, Soans & Pond,
Attys.

Patented Nov. 28, 1933

1,936,804

UNITED STATES PATENT OFFICE 1,936,804

SHAFT SEALING DEVICE

Louis H. Stein, Chicago, Ill., assignor to Aetna Ball Bearing Mfg. Co., Chicago, Ill., a corporation of Illinois Application May 5, 1932. Serial No. 609,397

6 Claims. (Cl. 288—1)

This invention pertains to seals, such as are adapted to be placed within a stationary housing about a rotatable shaft within the housing, for preventing oil, grease, dirt, water or other liquid from creeping along the shaft past the seal. The device of the invention has many applications and uses, one of which is the rear axle structure of automobiles, wherein the oil seal is tightly fitted within the tubular housing of the rear axle structure and snugly embraces the rotating rear axle to prevent oil or grease from the differential box creeping outwardly along the axle shaft and impairing the action of the rear brakes. Another use of the device may be as a seal to prevent the escape of oil or grease from a lubricated bearing. Still another use is to exclude dirt, grit, water and other foreign matter from a lubricated bearing.

Among the objects of the invention are to provide a seal of extremely simple construction, low cost of manufacture, and high efficiency; to provide a seal which will be oil tight at the highest operating temperatures and with sudden temperature changes; to provide a seal which may be readily used on vertical as well as horizontal stationary, rotating, and oscillating shafts at low or high speeds; to provide a device which will effectively retain lubricating oil and exclude water when applied to pump shafts and will supersede the stuffing boxes at present commonly employed for this purpose; to provide a sealing device in the form of a self-contained unit, with no moving parts, and involving in its use low static and dynamic friction loss; to provide a sealing device available in limited spaces, and ready for immediate use with no pre-treatment required, and to provide a seal to withstand pressure against the seal without straining the cushion sealing member.

Still other objects and attendant advantages of the invention will be apparent to persons skilled in the art from the following detailed description, taken in connection with the accompanying drawing, in which I have illustrated one practical and approved embodiment of the principle of the invention which, under severe tests has been found to satisfactorily effectuate the stated purposes and objects, and wherein—

Fig. 1 is a diametric section of the seal ready for application to a shaft.

Fig. 2 is a diametric section showing the seal fitted within a housing and mounted on a shaft.

Fig. 3 is a view similar to Fig. 2, showing the forms and relative positions of the parts of the seal after they have expanded under the heat of friction developed by a rapidly rotating shaft.

Fig. 4 is a side elevation viewed from the fiber side of the seal.

Fig. 5 is a side elevation viewed from the cork side of the seal.

Fig. 6 is a fragmentary section, enlarged, of the coated fiber pressure ring.

Fig. 7 is a fragmentary section, enlarged, of the coated cork sealing ring.

Fig. 8 is a fragmentary section, enlarged, of a steel retainer ring.

Fig. 9 is a sectional detail, showing a modified form of steel retainer ring.

Generally described, the device of the present invention comprises an outer shell or holder member preferably of steel and accurately formed and ground on outside diameter to a precision fit within a shaft enclosing casing or housing. Within this holder member or shell are housed the soft annular seal cushion preferably of surface treated cork, a hard but flexible flared annular pressure plate or ring preferably of surface treated indurated fiber, and a steel retainer ring. The internal diameters of the cork sealing cushion and of the fiber pressure ring are sufficiently less than the external diameter of the shaft to be sealed to cause both the cork and fiber rings to be laterally flexed as the shaft enters the seal, so as to tightly hug the shaft. Both the seal cushion and the pressure ring are specially surface treated by means and in a manner hereinafter described, so that the interstices or air cells within the same are hermetically sealed. As a result the pneumatic seal cushion automatically expands and contracts both laterally and radially with changing temperatures of the shaft or lubricant, remaining always oil tight in consequence, the pressure plate remaining unaffected by temperature changes.

Referring to the accompanying drawing, in which I have illustrated the device as embodied in an oil seal for an automobile rear axle structure, the outer shell or holder consists of an annular cup-shaped body 10, the peripheral wall of which is ground to a tight fit within a stationary tubular member 11, such, for example, as the tubular rear axle housing of an automobile. The bottom wall of the cup-shaped holder 10 is formed with a central opening 12 preferably somewhat larger in diameter than the external diameter of the shaft 13 which extends therethrough. Confined within this holder member is a hermetically sealed cork ring 14, which forms the pneumatic cushion or seal and lies next to the bottom wall of the holder member. A hard flexible flared pressure ring 15 preferably of indurated fiber or bakelite lies next to the cork ring 14, and a steel retainer plate or ring 16 closes the open side of the holder member. This retainer ring or plate 16 is formed with a concavo-convex body, and with an inwardly peripheral lip 17, at approximately 45 degrees to the body, that bears against the outer face of the fiber pressure ring 15 and pinches the outer portions of both rings 15 and 14 against the bottom wall of the holder 10. The inward swaging of the lip 17 considerably reduces the original periphery of the ring and, by displacement of the metal, produces fine serrations or teeth 17' (Fig. 8) on the periphery of the lip that bite into the ring 15 and thus prevent both rings 15 and 14 from turning with the shaft. The free edge portion of the holder member 10 is swaged or spun over the outer face of the retainer ring 16, as shown at 18, whereby the outer peripheral portions of the members 14, 15 and 16 are all tightly clamped within the periphery of the holder. By giving the retainer ring 16 the concavo-convex form shown, the width over all of the sealing device is reduced as compared with a device employing a flat retainer ring.

I have referred to the cork ring 14 as a pneumatic cushion seal, the reason for which will be apparent from the following description of its treatment. This ring is made from commercial manufactured cork which, as is well known, consists of ground natural cork mixed with a gluten or glue binder. This ring is surface treated with a liquid that penetrates and fills the surface pores of the ring and, when dry, forms a hard flexible dry coating film thereon, and thereby effectively seals the internal interstices or air cells which, as is well known, are very numerous throughout a body of manufactured cork. A substance which I have found excellently adapted to this purpose is a liquid going under the trade name of "Lionoil", the base of which is Chinese wood oil, otherwise known as tung oil. This is thinned with naphtha or an equivalent thinning fluid, to a proper consistency, and a small amount of a suitable drier, such as litharge, lead acetate, or the peroxide or borate of manganese, is preferably added. Spar varnish and boiled linseed oil may be used, but Chinese wood oil gives the most satisfactory results. The coating may be effected by simply dipping the cork ring in the coating liquid and allowing it to remain submerged a sufficient length of time for the oil to penetrate and fill the surface or skin cells or interstices of the ring. The treated ring is then withdrawn and allowed to thoroughly dry. The Chinese wood oil above described is especially well adapted for the purpose, because it will stand very high heat above the charring temperatures of cork and fiber and protects them from charring, and will bend without cracking, and is also uneffected by lubricating oil, grease, acids, alcohol, carbon-tetrachloride, water, gasoline, etc.

The fiber pressure ring 15 is treated in the same way. The described treatment of the cork and fiber rings effects two important results; it hermetically seals up the air in the pores of the rings, and it prevents the rings from absorbing the liquid and becoming saturated with the latter, which would render them ineffective as oil seals. In Fig. 7 I show an enlarged cross section of the cork pneumatic cushion seal 14 wherein I have indicated at 14' the thin, hard, dry coating film on the surface thereof; and in Fig. 6 I have illustrated a similar section of the hard fiber ring or pressure plate 15 with the hard, dry surface film 15' thereon.

When the ring is entered on the shaft by passing the latter first through the cork ring and then through the fiber ring, both of these rings are laterally flexed, as shown in Fig. 2, so that the fiber ring 15 not only snugly hugs the shaft but also, by virtue of its inherent greater elasticity, exerts a certain pressure against the cork ring, causing the latter also to snugly hug the shaft. Now, in the case of a shaft having a high speed of rotation, the friction between the shaft and the two rings develops considerable heat within the latter, and this heats up the air in the sealed cells of the cork ring causing the latter to expand both laterally and radially, practically filling the entire space between the holder 10 and the pressure ring 15, as indicated in Fig. 3, so that the cork ring becomes a pneumatic cushion tightly sealing the shaft against the passage of any oil or other liquid that may creep past the fiber pressure ring.

In Fig. 9 I have illustrated a modification of the retainer plate or ring 16, wherein the latter is formed with an outwardly directed peripheral lip or flange 20 that forms, with the body of the ring, an annular ridge 21 that bears against the fiber ring 15 and pinches the latter and the cork ring 14 against the bottom wall of the member 10, the free edge of the latter being swaged or spun over the outer side of the lip 20, as shown at 18'.

To prevent escape of oil or grease from a lubricated bearing, the seal is placed with its fiber side next to the bearing; and, in some installations, it is desirable to guard a lubricated bearing against the escape of oil and at the same time prevent access of dirt, grit or water to the bearing. This situation is readily taken care of by employing two seals such as I have above described placed back to back or in reverse tandem, but since such a use of the device is obvious, I have not deemed it necessary to illustrate the same.

When placed in situations where it may be required to prevent the passage of lubricating oil or other liquid under pressure along a shaft, the seal is placed with its fiber side toward the liquid under pressure and the stiffness of the fiber member prevents the pressure from straining the cork cushion sealing member.

I am aware that numerous cork packings are being used in shaft seals of this general type, but such cork packings are not efficient because the cork is not coated or otherwise protected from the action of oil and other liquids. I have found from actual test that when uncoated commercial cork is used for a seal, it absorbs liquids which affect the glutinous binder and cause the cork to disintegrate. The sealing of the cork in the manner and by the means herein described effectively prevents the liquid from gaining access to the binder, and also, as above pointed out, effectively seals the air in the pores of the cork so that, when the latter becomes heated through friction with a rotating shaft, this sealed air expands and causes the cork to swell and thus more tightly embrace the shaft.

I claim:

1. A seal of the type described, having a holder member adapted to occupy a casing and formed with a transverse opening adapted to encircle a shaft within said casing, a flat cork packing ring secured in said holder member, said packing ring being surface treated to seal the air in the pores thereof and the diameter of its inner periphery being sufficiently smaller than the diameter of the shaft to cause the inner portion of said ring to be flexed laterally when engaged with the shaft, and an elastic pressure ring secured in said holder member, said pressure ring adapted to embrace said shaft and exert a constant side pressure on said packing ring.

2. A seal of the type described, having a holder member adapted to occupy a casing and formed with a transverse opening adapted to encircle a shaft within said casing, a flat cork packing ring secured in said holder member, said packing ring being surface treated to seal the air in the pores thereof and the diameter of its inner periphery being sufficiently smaller than the diameter of the shaft to cause the inner portion of said ring to be flexed laterally when engaged with the shaft, and an indurated fiber pressure ring secured in said holder member, said pressure ring adapted to embrace said shaft and exert a constant side pressure on said packing ring.

3. A seal of the type described, comprising a holder member adapted to occupy a casing and formed with a transverse opening adapted to encircle a shaft within said casing, a flat cork packing ring in said holder member, said packing ring being surface treated to seal the air in the pores thereof and the diameter of its inner periphery being sufficiently smaller than the diameter of the shaft to cause the inner portion of said ring to be flexed laterally when engaged with the shaft, an indurated fiber pressure ring in said holder member, said pressure ring adapted to embrace said shaft and exert a constant side pressure on said packing ring, and a retainer ring locked in said holder member and serving to clamp the outer portions of said packing and pressure rings against a wall of said holder member.

4. A seal of the type described, comprising a cup-shaped holder adapted to occupy a casing and formed with a transverse opening adapted to encircle a shaft within said casing, a flat cork packing ring in said holder, said packing ring being surface treated with a pore-sealing and oil-excluding medium and the diameter of its inner periphery being sufficiently smaller than the diameter of the shaft to cause the inner portion of said ring to be flexed laterally when engaged with the shaft, an indurated fiber pressure ring in said holder, said pressure ring being surface treated with an oil-excluding medium and formed to embrace said shaft and exert a constant side pressure on said packing ring, and a retainer ring overlying and bearing against said pressure ring, the free edge portion of said holder being swaged over the outer periphery of said retainer ring to lock said rings in said holder.

5. A seal of the type described, comprising a cup-shaped holder adapted to occupy a casing and formed with a transverse opening adapted to encircle a shaft within said casing, a cork packing ring in said holder, said packing ring being surface treated with a pore-sealing and oil-excluding medium and the diameter of its inner periphery being sufficiently smaller than the diameter of the shaft to cause the inner portion of said ring to be flexed laterally when engaged with the shaft, an indurated fiber pressure ring in said holder, said pressure ring being surface treated with an oil-excluding medium and formed to embrace said shaft and exert a constant side pressure on said packing ring, and a concavo-convex retainer ring closing the open side of said holder and formed with an inwardly directed annular lip having a serrated edge bearing against said pressure ring, the free edge portion of said holder being swaged over the outer periphery of said retainer ring to lock said rings in said holder.

6. A seal of the type described, comprising a cup-shaped holder adapted to occupy a casing and formed with a transverse opening adapted to encircle a shaft within said casing, a flat cork packing ring in said holder, said packing ring being surface treated with a pore-sealing an oil-excluding medium and the diameter of its inner periphery being sufficiently smaller than the diameter of the shaft to cause the inner portion of said ring to be flexed laterally when engaged with the shaft, an indurated fiber pressure ring in said holder, said pressure ring being surface treated with an oil-excluding medium and formed to embrace said shaft and exert a constant side pressure on said packing ring, and a concavo-convex retainer ring closing the open side of said holder and formed on its inner side with an annular ridge bearing against said pressure ring, the free edge portion of said holder being swaged over the outer periphery of said retainer ring to lock said rings in said holder.

LOUIS H. STEIN.